United States Patent [19]

Dufresne et al.

[11] Patent Number: 4,623,920
[45] Date of Patent: Nov. 18, 1986

[54] CABLE NETWORK DATA TRANSMISSION SYSTEM

[75] Inventors: Michel Dufresne, Boucherville; Jean-Paul Champagne, Brossard; Daniel Dufresne, Montreal; Pierre Scott, Montreal; John Courtney, Montreal, all of Canada

[73] Assignee: Le Groupe Videotron LTEE, Quebec, Canada

[21] Appl. No.: 459,673

[22] Filed: Jan. 20, 1983

[30] Foreign Application Priority Data

Apr. 15, 1982 [CA] Canada ..................................... 401036

[51] Int. Cl.$^4$ ........................................... H04N 7/167
[52] U.S. Cl. ..................................... 358/122; 358/114
[58] Field of Search ..................... 358/122, 123, 114

[56] References Cited

U.S. PATENT DOCUMENTS

| | | | |
|---|---|---|---|
| 4,163,254 | 7/1979 | Block et al. | 358/122 |
| 4,388,643 | 6/1983 | Aminetzah | 358/122 X |
| 4,430,669 | 2/1984 | Cheung | 358/123 |
| 4,461,032 | 7/1984 | Skerlos | 358/122 |

FOREIGN PATENT DOCUMENTS

WO81/02961 10/1981 PCT Int'l Appl. ................. 358/123

Primary Examiner—Stephen C. Buczinski
Assistant Examiner—Linda J. Wallace
Attorney, Agent, or Firm—Antonelli, Terry & Wands

[57] ABSTRACT

A system for providing television, information and data signals via a transmission network to selected subscribers, to groups of subscribers, or to all subscribers connected in common to the transmission network. An address code signal is stored at the subscriber station, and an option code signal is sent to the particular subscriber station from a head end of the network. Signals having an address portion designative of the option code or address code signal are sent down the transmission line and are translated by the subscriber station in the event the address matches the first and second code signal. Thus signals can be sent to all subscribers which have option codes designated by the address of data packets transmitted down the transmission line. These groups of subscribers can be all subscribers, individual smaller groups of subscribers, or a group consisting of even a single subscriber. The option codes can be changed from the head end at will. Consequently data can be transmitted to various subscribers designated form the head end under its complete control. The data can be control signals for controlling the unscrambling of pay-TV signals, software for operating a microcomputer peripheral, data to enable operation of a local television channel converter to facilitate selection of particular channels depending on service paid for, etc. Since the option codes can be changed from the head end, cheating of the system is inhibited and the requirement to send service personnel to each subscriber to enable the acquisition of changed services is avoided.

23 Claims, 13 Drawing Figures

DOWNLOAD
MTO

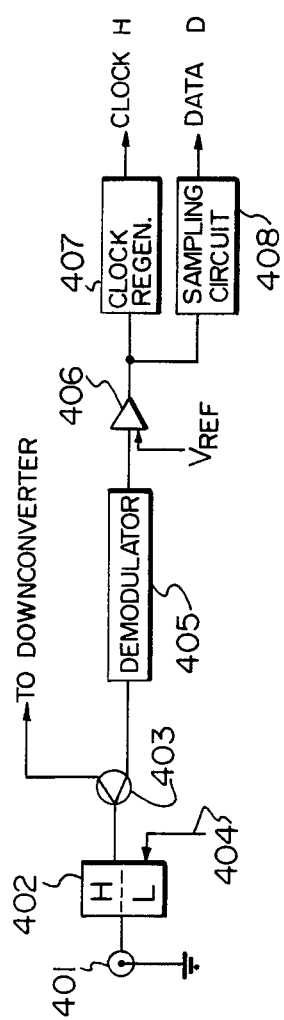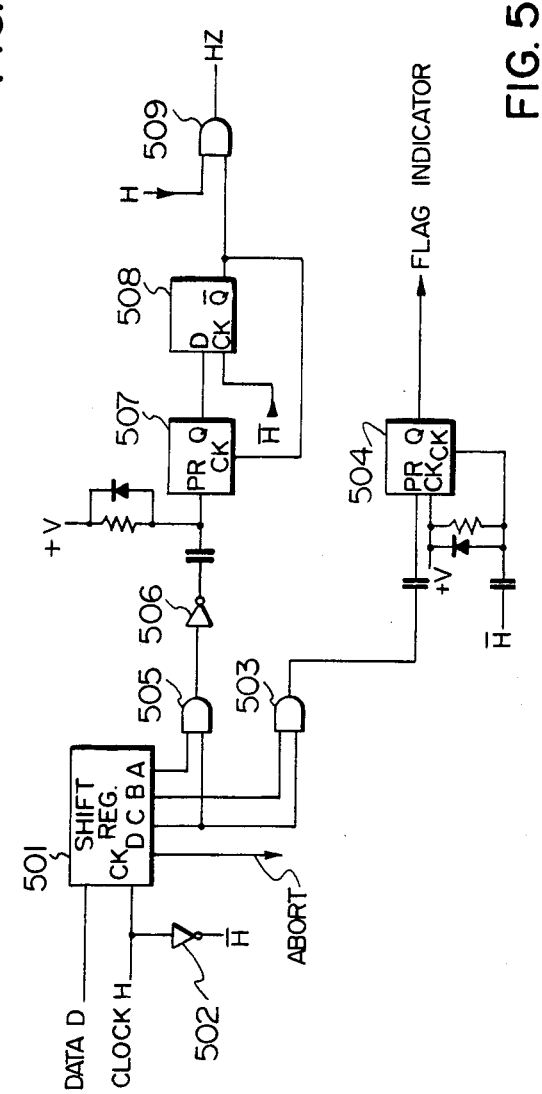

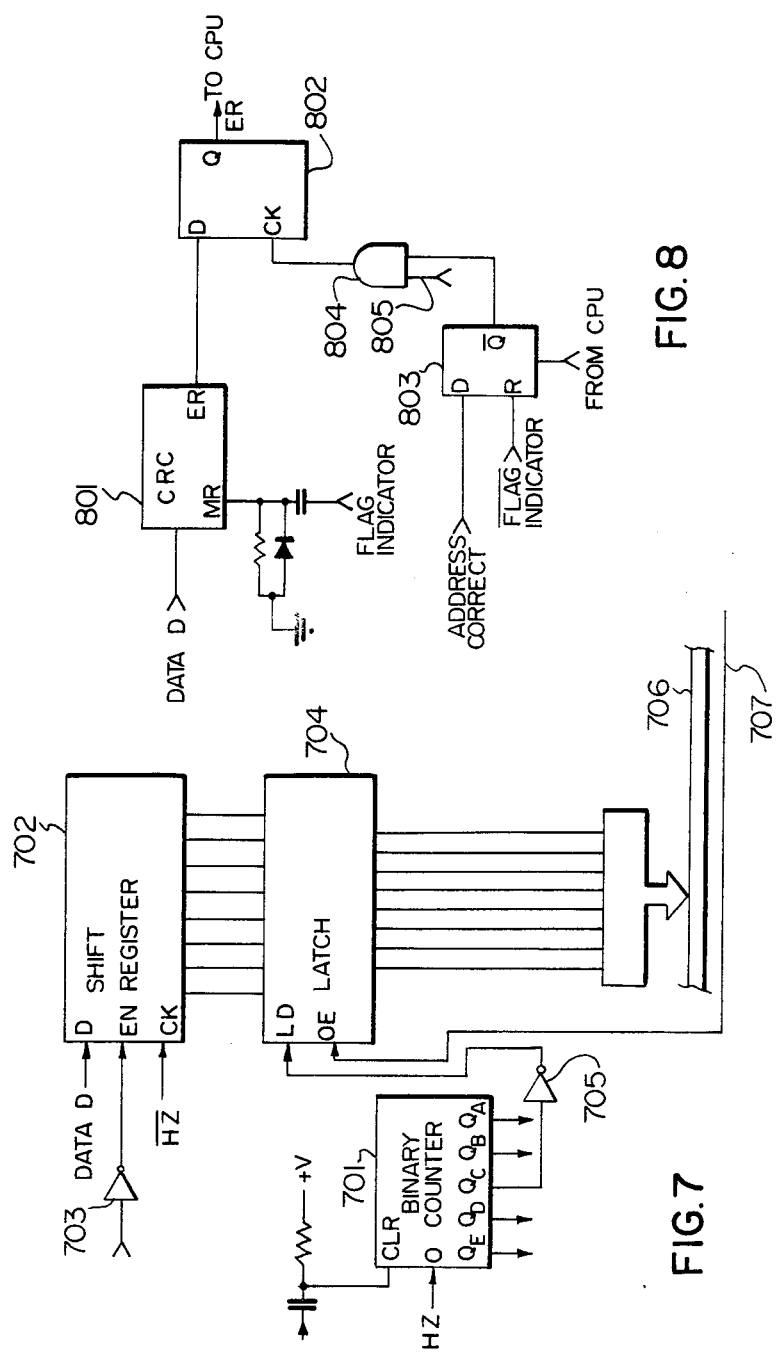

CABLE NETWORK DATA TRANSMISSION SYSTEM

This invention relates to a system for providing television, information and data signals via a transmission network to a plurality of subscribers, and particularly for providing such signals to selected subscribers, groups of subscribers, or all subscribers connected in common to the network.

Information signal distribution systems such as cable television systems typically distribute television signals to its subscribers via unidirectional "star" or "tree" type networks, although other forms of networks have been used from time to time. Additional services are being offered by some network operators, such as two-way communication, and distribution of data (such as teletext signals) to selected subscriber stations. In the former case, two-way repeaters have been installed to transmit subscriber originated signals (such as requests for service, polling, banking, alarms, orders for merchandise, etc.) toward the cable distribution system head end on a predefined frequency band, and in the latter case, data can be sent to subscriber stations which have predefined electronic addresses.

However it has been found that the cost of subscriber stations having predefined functional abilities, e.g. the ability to down-load a video game program, the ability to down-load different levels of information and data services, the ability to enable a pay t.v. descrambler, the ability to obtain certain otherwise prohibited television channels, is relatively high. If a subscriber station is provided with minimal functionality, the subscriber must obtain additional plug-in modules to provide additional functions when use of the station is to be expanded, or alternatively, the cable distribution company must send a serviceman to the subscriber location to add the equipment to facilitate the additional functions. Further, such systems can be duplicated by "pirates" who would be able to manufacture and sell modules which allow the subscriber to obtain programs or individually designated data out of control of the system operator, without payment.

The present invention allows the provision of a relatively low cost subscriber station, yet allows the station to acquire the ability to receive additional functions totally under the control of the system operator, and without any attendance requirement by a serviceman.

Briefly, in the present invention, a structure is provided whereby the "intelligence" required to translate or decode data and other signals transmitted from the head end is down-loaded from the cable distribution head end, which can modify this "intelligence", to be described below, at any time. The data acquisition abilities of the subscriber station is thus under complete control of the system operating company. The data reception capability of the local subscriber is variable at will from the cable distribution head end. A program which can be displayed, or which can be used to control certain subscriber station apparatus such as a Pay T.V. descrambler, channel converter, audio attenuator, etc., thus can be broadcast to all subscriber stations but stored only by those to which it has been addressed. A control program can be down-loaded to selected addresses consisting of an option table, allowing the acquisition of certain programs or services and the control of certain channels, but not others, for example. These programs can be changed as frequently as necessary from the head end.

Accordingly, to prevent unauthorized access to certain data signals from the cable distribution head end, the required codes for reception could be changed at intervals of seconds, hours, days, etc. thus blocking the unauthorized access. The code change can be made at regular intervals, or randomly, and of course the particular address change need not follow a readily discernible scheme.

This facility also allows the cable distribution company to transmit certain selected information to selected groups. For example, if a doctor's group is to receive medical information at certain regular intervals, those doctors which subscribe would obtain a predetermined reception code. The information to be received, e.g. transmitted as data signals, would be transmitted to all cable subscribers, but only the doctors having had the special code down-loaded into their service option table would be able to receive it.

Further, if an individual member of the group wishes to either subscribe to additional services or to delist from the special option, a new code can be down-loaded which updates his right to receive certain kinds of signals.

Each subscriber station can select packets bearing three types of addresses: a global address (destined to all subscribers), a service address (defined by the special services which individual subscribers can have access to), and a subscriber identification address, destined to a specific subscriber. The latter address code is retained in firmware at the subscriber station, which is included in a designated integrated circuit in the subscriber station apparatus installed at manufacturing time or at any other convenient time. This predetermined subscriber identification code is retained by the cable distribution service company and is used as the identifier when the down-loading of service data "intelligence" signals is effected, to allow the local subscriber to obtain services. This function will become clear upon consideration of the detailed description of the preferred embodiment of the invention below.

Each packet of transmitted data is equivalent to the form of a first level of encryption—the use of special additional bits such as busy bits, filter bits, etc., can make the data packets look "unusual" to a potential thief, i.e. difficult to steal the signal.

It should be noted that while a CATV system is described, the medium of transmission is not limited to coaxial cable, but the medium can be a fiber optic signal distribution system, satellite etc. Further, while an unidirectional system is described it is preferred that it should be used in a bidirectional system.

The invention in general is a signal transmission system comprising a head end, a transmission medium connected to the head end for carrying signals from the head end, a plurality of subscriber stations connected to the transmission medium, and apparatus at the subscriber stations for receiving and storing signals from the transmission medium designative of predetermined station addresses. Further apparatus at the subscriber stations which have stored the station addresses for receive and store program signals from the transmission medium designative only for the subscriber stations having stored certain ones of the station addresses. Further apparatus at the subscriber stations having certain ones of the option codes is adapted for receiving further signals from the transmission medium, and for translating the further signals, the translation being dependent on the prior storage of the program signals.

More particularly, the subscriber stations include apparatus for storing a first predetermined address code signal, apparatus for receiving from the transmission medium and storing a second predetermined option code signal, apparatus for receiving and storing a signal having an address component designative of the first or second code signals, an apparatus for translating the latter signal in the event the address component matches the first and second code signal, and thereby enabling operation of the subscriber station in response thereto.

Preferably the translating apparatus includes apparatus for enabling the subscriber station to translate further signals in a manner prescribed by the latter signal upon reception by the subscriber station of signals having an address component designative of the first or second code signals.

The invention also is a subscriber station for connection to a transmission medium for controlling the translation of signals carried by the transmission medium for application to a display device comprising apparatus for storing translation control signals received from the transmission medium which are addressed to the subscriber station, and apparatus for translating signals carried by the transmission medium under control of the control signals. Preferably the translation control signals are stored in an option table memory at the subscriber station.

More particularly, the subscriber station includes a demodulator for connection to the transmission medium for converting digital signals carried by the transmission medium to baseband; a data acquisition circuit for receiving the baseband digital signals and applying them to the bus system, a first logical address memory for permanently storing a first address code signal, connected to the bus system, a second random access memory, for storing a service code signal as an option table, connected to the bus system, a third random access memory connected in a circuit to the data acquisition circuit and to the bus system for storing control signals, an input output circuit connected to the bus system having a plurality of input and output control ports, and a television signal unscrambler having an input for connection in an input circuit path to the transmission medium, an output for connection in an output circuit path to a display device, and a control input connected to an output control port of the input output port circuit, a processor connected to the bus, whereby the unscrambler is enabled upon generation of an unscramble signal by the processor, applied to the input-output circuit, under control of the control signal.

In a further embodiment a video display generator is connected to the bus system for generating alphanumeric/alphageometric characters and/or pattern signals under control of the processor according to the control signal.

A better understanding of the invention will be obtained by reference to the detailed description below, in conjunction with the following drawings, in which:

FIG. 3A is a chart showing a preferred form of memory allocation;

FIG. 3B is a flow chart showing the preferred sequence of initialization;

FIG. 4 is a block diagram of a data demodulator to be used at the subscriber terminal;

FIG. 5 is a logic diagram of a circuit which derives certain signals to be applied to a data acquisition circuit;

FIGS. 6-8 are logic diagrams of different portions of the subscriber terminal;

Figure 1:
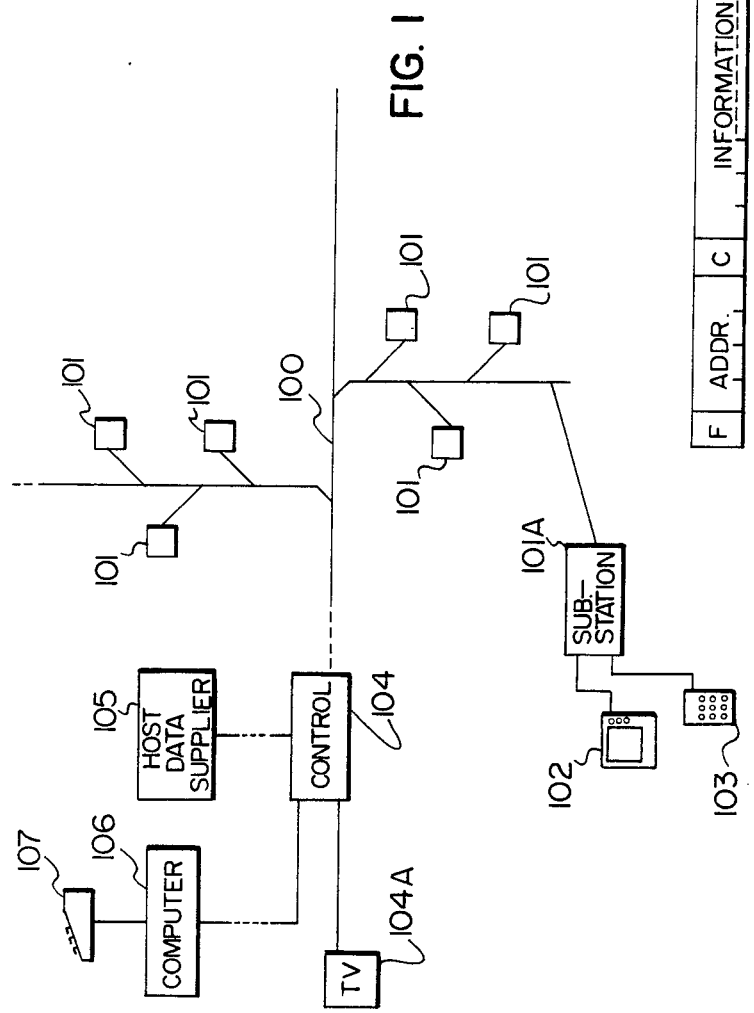
FIG. 1 is a block diagram of a signal distribution system using the present invention.

Turning to FIG. 1, a cable system is shown, using the present invention. A well known unidirectional (or bidirectional) tree form of CATV coaxial cable distribution system 100 has a plurality of subscriber stations 101 connected to its branches. One of the subscriber stations 101A, is shown in more detailed form, and has a television set 102 connected as well as a key pad 103 connected to it. The television set 102 provides a display for the subscriber while key pad 103 is used to command a pay-TV descrambler, to select channels from a channel converter, and, if the system is two-way, to send commands or response data to the cable system head end.

The cable distribution head end is connected to the system and is comprised of a controller 104, to which various signal inputs are provided. In a prior art form of cable television distribution system, the controller 104 would be comprised of a multiplexer for providing a plurality signals constituting television channels to the cable, one or more channels of which could be a pay-TV channel, which is to be decoded at the subscriber location.

In the system with which the present invention is used, however, the controller 104 receives the television channels as before from a television signal source 104A and multiplexes them with data signals carried on preferably one, but possibly more than one 6 megahertz wide otherwise unused channels. It will be understood that the 6 megahertz data signal bandwidth was selected since it is the bandwidth of a single television channel, and may be e.g. channel 14, or any other channel in the mid-band or super-band channel series, or some other frequency and bandwidth which does not interfere with the broadcast television carried by the cable.

The data channel carries data signals which mainly consist of information and control data, but which signals are multiplexed with subscriber initiation signals, signals which provide subscribers with particular services, testing signals, computer game signals, subscriber interaction signals, etc., each signal being formatted in a predetermined way to be described below, and designated by address to subscribers entitled to obtain such services.

The information and data to be transmitted is retained in a large, fast access memory (preferably a hard disk mass data storage system) in the controller 104, and is repeatedly sent down the cable. In the preferred system, 20,000 pages of 500 bytes average per page is stored in the memory and repeatedly transmitted down the cable, 1,000 pages per second at a rate of about 4 megabits per second.

The information is provided from one of a plurality of host data suppliers 105, with equipment which can be position either locally (adjacent the control 104) or remotely, being received by transmission line, a microwave link, etc. The data can thus be loaded into the control 104 memory from the remote location, by reading data stored on tapes, discs, or the like formatted locally or elsewhere.

In addition, a service computer 106 which is controlled by the cable distribution network operator interfaces with the controller 104, and includes a keyboard input 107. By this means, the local cable operator can input new service data into the local computer 106, which translates the data to signals, supplied to controller 104, whereby service entitlement changes can be provided to subscribers as designated by the keyboard operator. Controller 104 automatically formats the service information and the data supply by the host data supplier, and transmits either repeatedly, or by single transmissions, the formatted data, in asynchronous packets which include coded headers specifying which class of service subscribers stations can translate the data.

The resulting system allows all cable television subscribers to receive normal cable television, and allows those subscribers which have paid for pay-TV to operate their local descramblers. The facility also allows the cable system operator to transmit predetermined information data signals to all subscribers, and certain information to predetermined subscribers which are identified by service address (class of service). While in a downstream one-way distribution system, such predesignated data is repeatedly sent over a predetermined time period, e.g. a day or days, a two-way system would allow a local subscriber to request predetermined data signals to be transmitted to him (assuming he has the right to receive such requested signals), by pushing the appropriate key-pad switch buttons.

Figure 2:
FIG. 2 depicts the data format of signals sent along the system in the preferred embodiment using the well known HDLC protocol.

The data signals are transmitted from the control 104 in standard HDLC, expanded address format which is illustrated in FIG. 2. In addition, as a part of a collison avoidance system for data signals transmitted upstream toward the head end, the signal format contains two bits of information (herein termed "busy bits") which determines the state of the upstream channel upon receipt of any upstream signals by the control 104.

The two busy bits facilitate the indication of four "busy" states: idle, busy, collision detected, and priority. While this aspect does not form the substance of the present invention, suffice to say that the busy bits are inserted into the data signal at the head end following a flag byte, (at both ends of each packet, or between packets) and each 64 bits following (although some other format could be used if desirable).

The signals are sent in asynchronous packet form, the horizontal axis of the signal formation shown in FIG. 2 designating time from left to right. As noted earlier, the bits are transmitted at about a 4 megabit per second rate, preferably NRZI modulated on an RF carrier at the desired transmission frequency.

According to the expanded address HDLC protocol, the first byte is a flag byte, followed by four address bytes. In the preferred form of the present invention, the first two address bytes designate the digital channel number and the second two address bytes designate the page number. This is followed by a control byte. After the control byte follow all of the information bytes. This could constitute, e.g., 6,400 bits, which would be required to form one displayed page, 40 characters wide by 20 lines, each character being 8 bits long.

The information bits are followed by a frame check sequence FCS, which, as is well known, is a series of bits which, in combination with the other bits between the flags, provide the solution to a polynomial of which the remainder is 0, and is used for transmission error detection. The FCS bits are followed by a flag byte.

The signal packet described above also contains the aforenoted busy bits, and "zeros" inserted where otherwise a series of six "ones" might appear. Conventionally a series of "ones" designates an abort, the abort designating that the content of the packet should be disregarded at the subscriber station.

Except for the busy bits, the above-described packet follows the CCITT standard X.25 recommendation, described in international standard No. IS03309, entitled "DATA COMMUNICATION—HIGH LEVEL DATA LINK CONTROLLED PROCEDURES—FRAME STRUCTURE".

The packets can be formatted at the control 104 in a well known manner.

Figure 3:
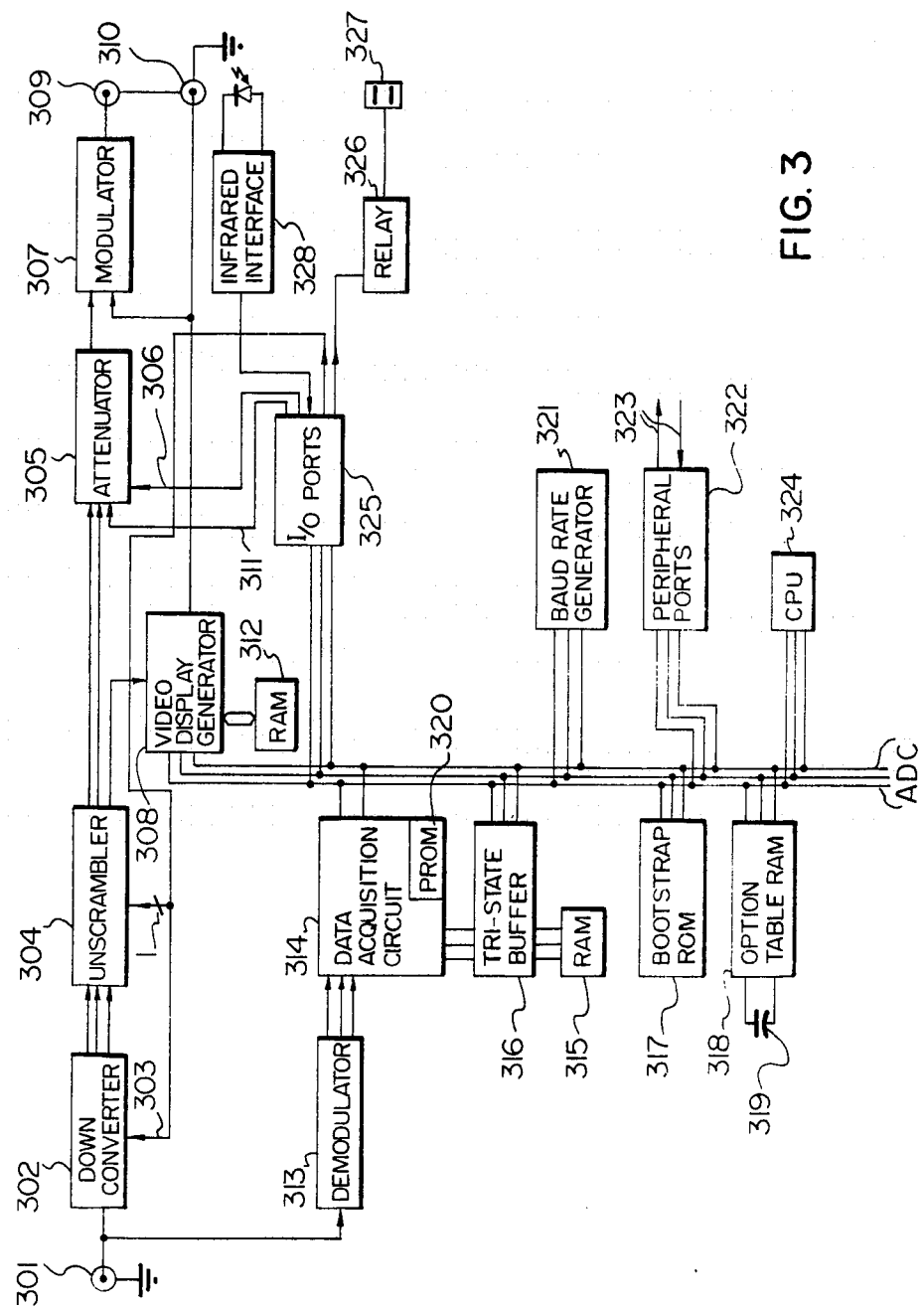
FIG. 3 is a block diagram of the subscriber terminal.
Figure 3:
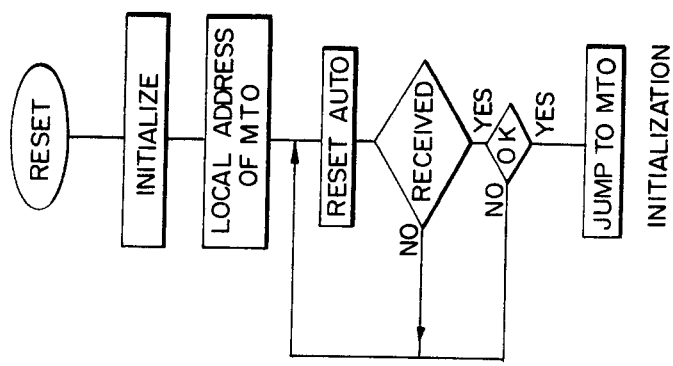
Figure 3:
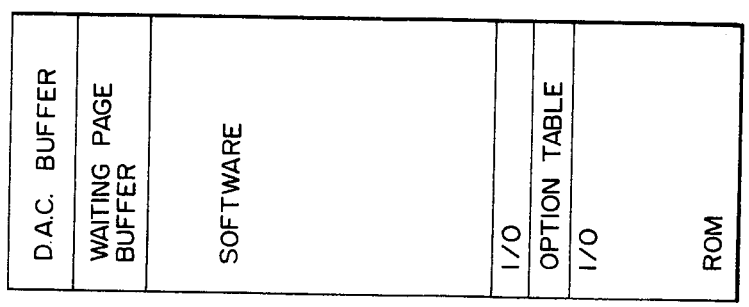

FIG. 3 is a block diagram of the preferred form of the subscriber station concerned with reception of downstream data. The signal from the cable drop is received via terminal 301, and is applied to down-converter 302. Down-converter 302 is a television channel converter, which receives enable and switching instruction signals on bus 303. Down-converter 302 preferably has three outputs, one video output at baseband and two audio outputs, to facilitate stereophonic sound television, music, radio signal reproduction etc. These signals are passed to unscrambler 304, which has an enable input connected to bus 303. Unscrambler 304 can be of any known type, e.g. which will pass normal signals but will only unscramble and pass scrambled signals if it receives an enable input on its enable lead. If preferred, a descrambling code can be provided to unscrambler 304.

The audio signals from the unscrambler are applied to a voltage controlled attenuator 305, the output of which is applied to one input of television modulator 307. The voltage controlled attenuator is connected to a control bus 306, which is connected to an output port to be described later. The output signal of attenuator 305 is connected to one input of modulator 307.

The baseband video from unscrambler 304 is applied to video display generator 308, the output of which is connected to another input of modulator 307. The output of modulator 307 is connected to an RF connector 309, and the output of video display generator 307 is connected to a baseband R.F. connector 310.

In operation of the above-described circuit, normal and scrambled television signals as well as the R.F. modulated data signals are received at terminal 301, are down-converted in down-converter 302 to baseband. The frequency to which the down-converter is responsive is set by a control signal received from an input-output (I/O) port circuit (to be described later) which is connected to main address and control buses of the subscriber station.

Normal television signals are passed through unscrambler 304. Scrambled signals are only unscrambled upon operation of the unscrambler, which is enabled by a signal appearing on its enable input, which is received from the I/O port circuit. If an appropriate class of service data signal is not stored in the subscriber station the I/O port does not enable the unscrambler 304, and similarly if an appropriate class of service data signal is not stored in the subscriber station down-converter 302 does not operate. Since the class of service signal is transmitted to selected subscriber stations by the head end, the head end can control the utilization of the down-converter and unscrambler services.

As noted earlier, the audio outputs from unscrambler 304 are applied to voltage control attenuator 305. Attenuator 305 also has a control input to which lead 306 is connected as as well as to an I/O port circuit output. Accordingly data present on the address, data and control buses of the local subscriber station (which data can be at least partly under control of the local subscriber) can be used to attenuate the audio signal at baseband. The audio signal can of course be applied to a local speaker if desired. In addition, an I/O port output lead 311 is connected to an input of attenuator 305 whereby data bits output from the I/O port circuit can be provided as an audio output to the attenuator. Accordingly synthesized music, synthesized voice, indicator tones, or the like can be provided to the subscriber.

The output signal from attenuator 305 is applied to one input of modulator 307. At the same time, the baseband video from unscrambler 304 is applied through video display generator 308 to another input of modulator 307. Modulator 307 modulates the video and audio signals on an R.F. television carrier, e.g. typically at channel 3 or 4, and presents the resulting signal to R.F. connector 309 for application to the anntenna input of a standard television set. Alternatively, a video monitor can be connected to RF connector 310 for receiving baseband video.

Video display generator 308 has a random access memory RAM 312 connected to it in a well known manner. The video display generator 308 is connected to a local bus system comprised of address A, data D, and control C buses. Accordingly data signals are carried on the A, D and C buses (hereafter termed the ADC bus).

The signals received at terminal 301 are also applied to the input of demodulator 313. Demodulator 313 provides clock, data and flag indicator signals to a data acquisition circuit 314 which is also connected to the address A and control C buses. A dynamic random access memory RAM 315 (typically nominally 16,000 bytes in size) is connected to tri-state buffer 316, which itself is connected to ADC bus and to data acquisition circuit 314.

A boot-strap ROM (read only memory) 317 is also connected to the ADC bus, and an option table CMOS RAM, random access memory 318, typically 256 bytes by 8 bits is also connected to the ADC bus.

A large capacitor 319, (e.g. one farad) is connected to the option table CMOS RAM 18, and is charged up by a local power supply (not shown) and which retains operating power for the CMOS RAM in case of a power failure in a well known manner, in order to safeguard retention of data.

A logical address PROM (programable read only memory) 320 is also connected to the ADC bus and can be integrated within another circuit such as the data aquisition circuit (to be described later) or CPU. As well, a baud rate generator 321 is connected to the ADC bus and to peripheral bi-directional port circuit 322, which are also connected to the ADC bus. The peripheral port circuit 322 have a plurality of input and output terminals, e.g. for providing an RS-232 protocol output bus format, a TELIDON format, a printer interface, a microcomputer interface, etc., via input-output leads 323.

A local central processing unit CPU 324, e.g type MC6809 is also connected to the ADC bus.

An input-output (I/O) port circuit 325 referred to earlier and which operates down converter 302, unscrambler 304, attenuator 305, etc., is also connected to the ADC bus. An output of the I/O port circuit 325 is connected to a relay circuit 326 for operating a power outlet 327 and an input to the port circuit is connected to an infrared interface 328 of well known construction. Infrared interface 328 has an infrared sensing diode 329 connected thereto for receiving infrared pulses from a remote keypad. Of course infrared need not be used, since the keypad can be connected to the port circuit 325 by a cable, an ultrasonic link, etc.

It is assumed that a person understanding this invention is sufficiently skilled that a full description of the operation of the CPU in communication with the various peripheral units to be described below need not be made, and would be redundant, given the structural systemic description and algorithmic description of interaction herein. The data signals applied to the ADC bus, controlled by the CPU can control down converter 302, unscrambler 304, attenuator 305, and relay 326 via input-output port circuit 325. In addition, data signals received by interface 328 from a remote keypad can be passed through I/O port circuit 325 to the ADC bus, and be dealt with by the CPU.

The following description, however, deals in detail with the operation of this circuit whereby it can acquire data signals from the cable system which data signals contain an address which defines the local subscriber unit. The structure of this unit whereby its service address is changeable at will and at any time, and whose intelligence (option table and operation programs) is down-loaded under control of the head end is believed to be a particularly useful aspect of the present invention.

As mentioned earlier, the four bytes immediately following the first flag in each data packet contains address bits. There are preferred to be three types of addresses, a logical address, a global address, and a service address. The first two bits of the address are used to designate which of the three forms of address follows. The logical address designates a particular subscriber, the global address designates all subscribers and the service address designates particular subscribers which have addresses corresponding to particular services.

The logical address which defines each particular subscriber station has previously been stored in logical address PROM 320. This address is fixed by the cable system operator, and is installed or programmed into the appropriate integrated circuit of the station prior to the time of installation of the apparatus. The option table memory 318 contains the service addresses, and are down-loaded as data to be stored under control of the local CPU 324, which data is made available as will be described in detail later.

The global address is a wired address, and as such is fixed. The global address designates all of the subscribers connected to a particular distribution tree. The global address can be used by interactive systems, such as for delivering electronic mail, etc. whereby the head end controller requires the information of the address of a particular distribution tree, whereby all of the subscriber terminals can be accessed.

The bootstrap ROM 317 contains only sufficient firmware to facilitate operation of the CPU to control startup and storage of initial control signals down-loaded from the cable transmitted from the head end controller, and designated for this particular subscriber, acquired by data acquisition circuit 314.

Therefore, prior to initialization, option table RAM 318 is empty of valid data, logical address PROM 320 contains the local subscriber identifying address, bootstrap ROM 317 contains aninitialization routine, and RAM 315 is empty of valid data.

Bootstrap ROM 317 also should contain sufficient stored control signals such as to enable CPU 324 to control I/O port circuit 325 and thus down-converter 302, whereby a basic television channel converter service can be provided. After initialization, additional control signals are stored in RAM 315 whereby enhanced converter service is provided pay T.V. unscrambler service, information, computer games, software services, if such services have been been purchased by the subscriber.

A packet of data is sent to a logical address which designates the service address for this subscriber station and codes which may be common with many other subscriber to which the same kinds or classes of service is provided. The service can designate that pay-TV is to be provided, that certain forms of information or data can be acquired and displayed, etc. The service address data is loaded into the option table memory 318, is stored, and is protected from power failures by the energy stored in the capacitor 319.

Of course all of the random access memory can be combined as a single physical memory.

A preferred form of the memory associated with data acquisition circuit 314 is shown in FIG. 3A. The memory is divided into a DAC buffer, a waiting page buffer, space for holding the downloaded software, space for input-output software, an option table section, further space for input-output software and the read only memory (ROM) portion.

Figure 3C:
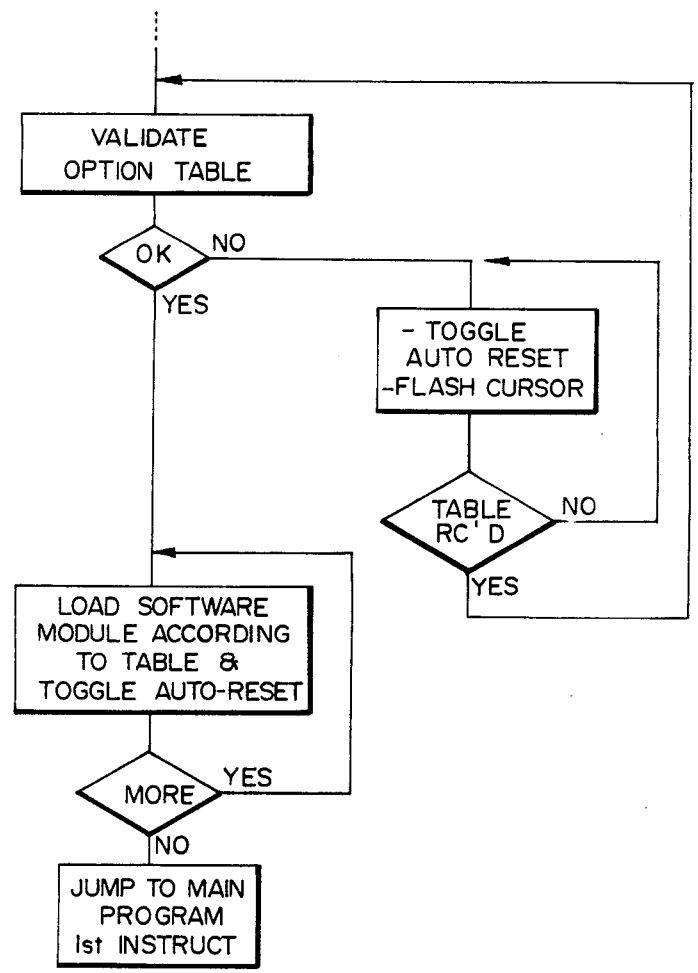
FIG. 3C is a flow chart showing the preferred sequence of downloading a temporary software module.

FIGS. 3B and 3C are flow charts depicting the operation during initialization and during downloading of a temporary software module (referred to as MTO), which enables the apparatus to download the remainder of the software.

The initialization phase starts after a hardware reset which is caused by a power down or initial installation. At his time the content of the memory except for the ROM is invalid, and the software to be executed is contained in the ROM. The ROM should contain temporary interrupt vectors, in particular that of a CPU interrupt request. The software contained in the ROM for initialization first defines the initialization and inhibits all the data acquisition circuit address comparisons (the hardware to be described later), thus stopping all further acquisition. It loads into the data acquisition circuit the packet address consisting of the software downloading digital channel number and of the page 0 of that channel. It then waits in a loop until page 0 is received correctly, while toggling the auto-reset of the CPU.

Data packets are sent from the head end from the logical address. As it receives each packet, the data acquisition circuit checks the data in a CRC circuit (to be described later with reference to FIG. 8) that the packet is error free and that the protocol is also correct. The information field of the packet is then transferred into the waiting page buffer memory. At this time, the acquisition is completely controlled by the CPU and there is no danger that the acquisition circuit overwrites the memory during the transfer. The received software must nevertheless be transferred into a convenient location, of a temporary nature, but preferably outside the active memory region where the further downloading of the software will occur.

This first software packet that has been received is a temporary software module (called MTO), the purpose of which is to proceed with the downloading of the rest of the software. At this time the execution of the initialization ends, with a jump to the first instruction to the MTO module in the waiting page buffer.

Turning now to FIG. 3C, first the MTO software verifies the validity of the existing option table. This table is contained in RAM 318 which is protected against short to medium duration power failure by capacitor 319. The validation is accomplished as will be described later with reference to FIG. 8.

In the case of a first installation or a prolonged power failure the option table will be found to be invalid. The MTO in this case enables the logical address comparison of the data acquisition circuit (the global and service address comparisons should at that time be inhibited). A simple message such as a flashing cursor should be displayed on an output device such as a TV terminal connected to terminals 309 or 310 which indicates that the interface is waiting to receive an option table.

If the circuit is either a new installation, or there has been a major power failure which is known by the head end, the required page or pages of data is inserted into the digital channel cycle by head end personnel. Otherwise the subscriber will be required to contact the head end in order to have his option table put on line. In case of a bi-directional interface the request for the option table would be done through the return channel automatically.

After reception of the option table packet, it is again checked and transferred into its proper location in the memory shown in FIG. 3A.

The option table contains page numbers relating to the digital downloading channel. It is with these page numbers that the acquisition addresses will be formed by the concatenation of the number of the digital channel and the page number of the desired software module. This packet address will then be downloaded into the service address register of the data acquisition circuit.

The MTO software module then starts a download loop consisting of the following steps:

(1) Read the next page number in the table,
(2) Formulate a new page address,
(3) Load this address in the data acquisition circuit and enable the service address comparison,
(4) After receipt and validation of the packet return to step 1.

Each time the packet is transferred from the buffer in the data acquisition circuit to a location in the memory contiguous to the previous one, only the useful portion of the packet is transferred.

At the end execution jumps from the first instruction of the received software and normal operation begins.

Data acquisition, which provides the data signals to the ADC bus for operation thereupon according to the above-described algorithm will now be described. The data acquisition consists of detection of flags, address comparison, extraction of zeros and checking for errors and passage of the data signals to the ADC bus.

Turning to FIG. 4, the data demodulator is shown. The signal generated at the head end is received on terminal 401 (which corresponds to terminal 301 in FIG. 3), and is applied to filter 402. Filter 402 preferably has a high frequency passband between 50 and 300 megahertz, the signal from the cable passing therethrough being applied to directional coupler 403. Signals to be sent to the head end in the case of a bidirectional system are received on lead 404 and are applied through a low-frequency passband portion of filter 402, for application to the cable via terminal 401. The passband of the low frequency portion of filter 402 can be specific to the return channel, which typically will be somewhere between 5 and 35 megahertz. Of course, each of the filter portions can be separate, and indeed, in a one-way downstream structure there will be no upstream direction signals and therefore no low pass portion of the filter 402 need be provided.

One output of directional coupler 403 is connected to down-converter 302 (FIG. 3), for providing the television signals, and is dealt with as described earlier. The other output of directional coupler 403 is connected to the input of a demodulator 405 in which a signal is level adjusted, impedance corrected, is converted from e.g. channel 14 having center frequency at 120.016 megahertz to intermediate frequency (e.g. 45.75 megahertz), is detected, automatic gain corrected, and is applied to a threshold detector 406. Threshold detector 406 should contain a hard limiter and the output signal thereby has noise rejected. The output signal is applied to clock regenerator circuit 407 and to sampling circuit 408. The clock regenerator 407 preferably is a phase locked loop. Since the form of data in each packet is preferred to be in NRZ (non-return to zero) form, sampling circuit 408 is preferably an NRZ detector.

The output of clock regenerator 407 is a clock signal H which is derived from the signals provided from the head end and the output of the sampling circuit 408 is a data signal D.

It should be noted that the output signal from the head end controller while being comprised of packets of data which are of variable length, are also separated by variable time. It is preferred that the variable time should be filled with flag bits. Therefore while the packets are transmitted asynchronously, there is synchronism with respect to each bit both of the packets and the interleaved time between packets.

Turning now to FIG. 5, the circuit shown both detects flags and deletes the zeros which, it was noted above, are inserted accorded to the HDLC protocol to distinguish normal signals from abort signals. The data D output from FIG. 4 is applied to shift register 501, and the clock signal H is applied to the clock input of the same shift register. An inverted clock signal $\overline{H}$ is obtained from the clock H signal passing through an inverter 502.

As the input signal on the data D lead is passed into shift register 501, eventually two adjacent "1's" designating a flag appear on its L and C outputs. These are applied to the inputs of AND gate 503, which is enabled and its output is applied to the reset input of flip-flop 504. The $\overline{H}$ clock signals are applied to the clock input of flip-flop 504. Thus when a flag has been received, there is a high level output on the Q lead of flip-flop 504, which is a flag indication signal.

The sixth bit position of the input data bits also causes output A and C of shift register 501 to go high. AND gate 505 is enabled in response, the output of which is inverted in inverter 506, and is applied to the reset input of flip-flop 507. The Q output of flip-flop 507 is applied to the data D input of flip-flop 508, its $\overline{Q}$ output being applied both to the clock input of flip-flop 507 and to one input of AND gate 509. The clock H is also applied to the other input of AND gate 509, and the resulting output of AND gate 509 is designated the HZ signal.

Thus the sixth data pulse in the incoming data causes the output of AND gate 505 to go high, and the input of flip-flop 507 to go low. This is translated through flip-flop 508 in sync with $\overline{H}$, and thus inhibits the operation of AND gate 509 at the sixth bit position. The H clock signal thus cannot pass through AND gate 509 at the sixth bit position. The HZ clock signal thus is in synchronization with the H clock signal, except at the sixth bit position, at which time it is not present. This clock signal can thus be used to clock the remainder of the data acquisition circuit whenever a bit is present except for the zero insertion bits.

Figure 6:
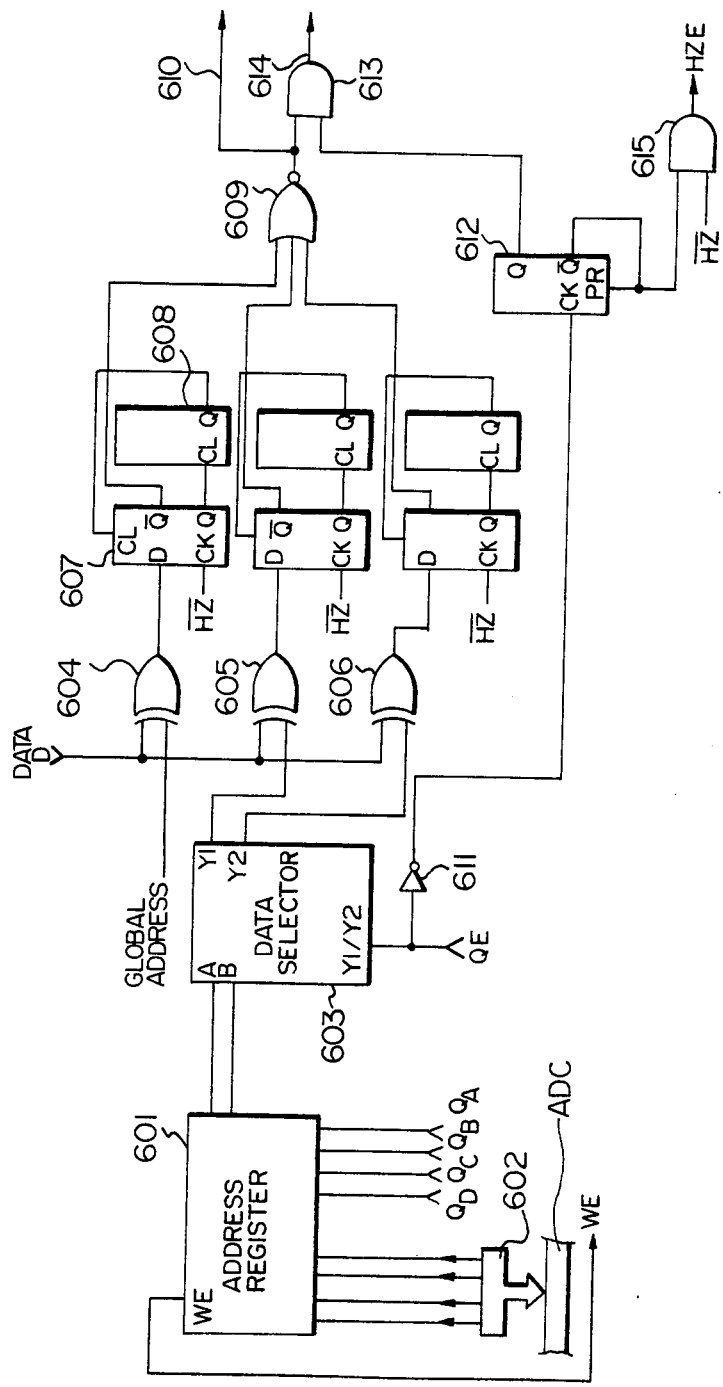

Turning to FIG. 6, a circuit is shown for checking the address of the received signal. For an understanding of its operation, however, reference should first be made to a portion of FIG. 7.

A binary counter 701 receives the zero corrected clock signal HZ and provides binary outputs at its output terminals $Q_A$–$Q_E$. Its clear CLR input is connected to the flag indication output from FIG. 5. Consequently each time a flag indication is received, binary counter 701 is reset, which starts counting again with each successive HZ clock pulse. The outputs of binary counter 701 thus are a count of the data bits received following each flag.

It will be recalled that flag bytes are transmitted between packets. Therefore between packets, binary counter 701 is continuously reset.

Turning now to FIG. 6, the binary counter outputs $Q_A$–$Q_D$ are connected to address register 601. Address register 601 is a register in RAM 315 into which the logical and service addresses are loaded by the microprocessor, having accessed these addresses from the logical address PROM 320 and option table 318 (FIG. 3). The data inputs of address register 601 are connected to bus ADC via bus 602, under control of the write enable WE lead from the microprocessor.

The address is loaded into a data selector 603, which has two outputs: Y1, for carrying the service address, and output Y2 for carrying the subscriber address.

The data D signal (FIG. 4) is applied to one input of each of three exclusive OR gates 604, 605 and 606. The global address is fed from a hard wired circuit (a well known circuit which will output a 32 bit serial code, such as a parallel input, serial output shift register having predesignated parallel inputs grounded), this signal designating the global address of the subscriber station, and being applied serially to the second input of exclusive OR gate 604.

Similarly, output Y1 provides the 32 bit serial service address to the second input of exclusive OR circuit 604, and output Y2 of data selector 603 provides a 32 bit subscriber identification address code to the second input of exclusive OR circuits 606.

Consider now the operation of exclusive OR circuits 604. Its output will go high if either of its inputs is high or low, but not both. Assuming that the global address is identical to the data being fed in, both inputs to exclusive OR circuits 604 will be identical. Consequently, its output is low. This is applied to the data input of a flip-flop 607 which has its Q output connected to the clock input of a flip-flop 608. The Q output of flip-flop 608 is connected to the clear input of flip-flop 607. The Q output of flip-flop 607 is connected to one input of NOR gate 609.

Accordingly, when both of the global address and data are identical for each bit, there is no data input signal to flip-flop 607. Consequently, its Q output is low, providing a low input to NOR gate 609. If all of the inputs of NOR gate 609 are low, its output is high.

However, if there is a difference between the inputs applied to exclusive OR circuit 604, its output goes high, allowing flip-flop 607 to be clocked from the HZ clock, the zeros-removed clock signal. Flip-flop 607 changes state, which causes flip-flop 608 to be clocked, changing state. As a result flip-flop 607 is cleared back to its original state. However, its output Q has changed state, providing a high level input to NOR gate 609. Its output goes to low level.

Exclusive OR gates 605 and 606 operate similarly. In these cases, however, the service address and subscriber addresses retained in address register 601 are each compared to exclusive OR gate 605 and 606 respectively. As a result if any of the inputs to NOR gates 609 are low, indicating that a match of the address signal on the data lines has occurred with either the global address, service address or subscriber address, the output of NOR gate 609 goes high. The output lead of NOR gate 609 which carries this "address correct" indication is referenced 610.

Output $Q_E$ of binary counter 701 (FIG. 7) is passed through inverter 611 and is applied to the clock input of flip-flop 612. Its Q output is connected to one input of AND gate 613 with the "address correct" output from NOR gate 609. Since the Q output of flip-flop 612 thus goes high every 32 bits, the output from NOR gate 609 is passed through AND gate 613 once each 32 bits, and if the output on lead 610 is high, the output of AND gate 613 goes high.

It was noted earlier that the address of each packet following each flag is 32 bits long (4 bytes) each being 8 bits in length. Thus if NOR gate 609 has a high level output at 32 bits following the flag, a high level output on AND gate 613 is an indication that the address has been completed and is good. The lead carrying this "address good" signal at the output of AND gate 613 is referenced 614.

The $\overline{Q}$ output of flip flop 612 is connected to the reset input PR of flip-flop 612 and also to one input of AND gate 615. The other input of AND gate 615 is connected to the $\overline{HZ}$ lead, and the output of AND gate 615 being referenced HZE. The output of AND gate 615 going high thus indicates that 32 bits have been received and counted (and that the address counts have gone through).

Having now determined that a flag has been received, that the 32 data bits following the flag correspond to one of the global, service or subscriber addresses, the circuit is now ready to pass input data to the ADC bus for reception and for use by the CPU. This is effected by the circuitry shown in FIG. 7.

The data D signal is applied to the data D input of shift register 702. The $\overline{HZ}$ clock source is applied to the clock input of shift register 702 and the "address correct" signal from lead 610 in FIG. 6 is applied through inverting buffer 703 to the enable EN input of shift register 702.

Consequently shift register 702 is enabled when the "address correct" lead goes high at the end of the address checking cycle (32 bits). The data input is clocked into shift register 702 in synchronism with the clock $\overline{HZ}$. The signal is converted from serial to parallel in shift register 702, and is held in latch 704.

Count output $Q_c$ of binary counter 701, passing through inverter 705 is applied to the load LD input of latch 704. This count output of counter 701 is provided so that when shift register 702 is full, its output is latched in latch 704. While shift register 702 is filling with further input data, latch 704 eventually is enabled to output its held data onto the ADC bus.

The outputs of latch 704 are applied in parallel to the ADC bus 706, and the output enable input of latch 704 is connected to the output enable terminal of the CPU via lead 707.

In this manner the data to be operated upon by the CPU and stored either as instructions or service address data (options), or data to be applied either directly or after processing by the CPU via the video display generator is acquired from the cable.

FIG. 8 shows the data checking circuit. The data input signal is applied to a CRC circuit 801. This well known function, solves a polynomial using the input data as a binary number, and provides an output signal if there is a remainder to the solution of the polynomial. This output signal is provided on the lead connected to the data D input of flip-flop 802. A reset signal is applied to the MR input of the CRC circuit 801 from the flag indicator. Accordingly the CRC circuit is reset each time a flag is received. Consequently from the reception of the flag, the polynomial is solved until the next flag is received, and at this point the output of the ER lead should be zero. If it is not, the ER lead is high causing the flip-flop 802 to change state, and an ouput is provided to the CPU, which indicates that the information in the packet contains errors, and possibly should be ignored.

Flip-flop B02 is clocked as follows. The "address correct" signal is applied to the data input of a flip-flop 803, while the inverse flag indicator signal is applied to the reset input of the flip-flop. Consequently flip-flop 803 is reset at the beginning of each received packet. However as soon as the "address correct" signal has been generated on lead 610, a data signal is applied from the "address correct" lead to flip-flop 803. Flip-flop 803 is clocked from the CPU, providing an input to AND gate 804. A second input 805 is provided to AND gate 804 from a clock source. The output of AND gate 804 is connected to the clock input of flip-flop 802.

Accordingly assuming that the "address correct" signal has been received, the second flag indication (at the end of the packet) causes generation of a clock pulse to flip-flop 802. If the polynomial calculation remainder output from the CRC circuit is low, the Q output of flip-flop 802 is high, which provides an indication to the CPU that all of the input data received is error free. However, if a remainder exists, flip flop 802 changes state, and the CPU is given the indication that the data is faulty.

Figure 9:
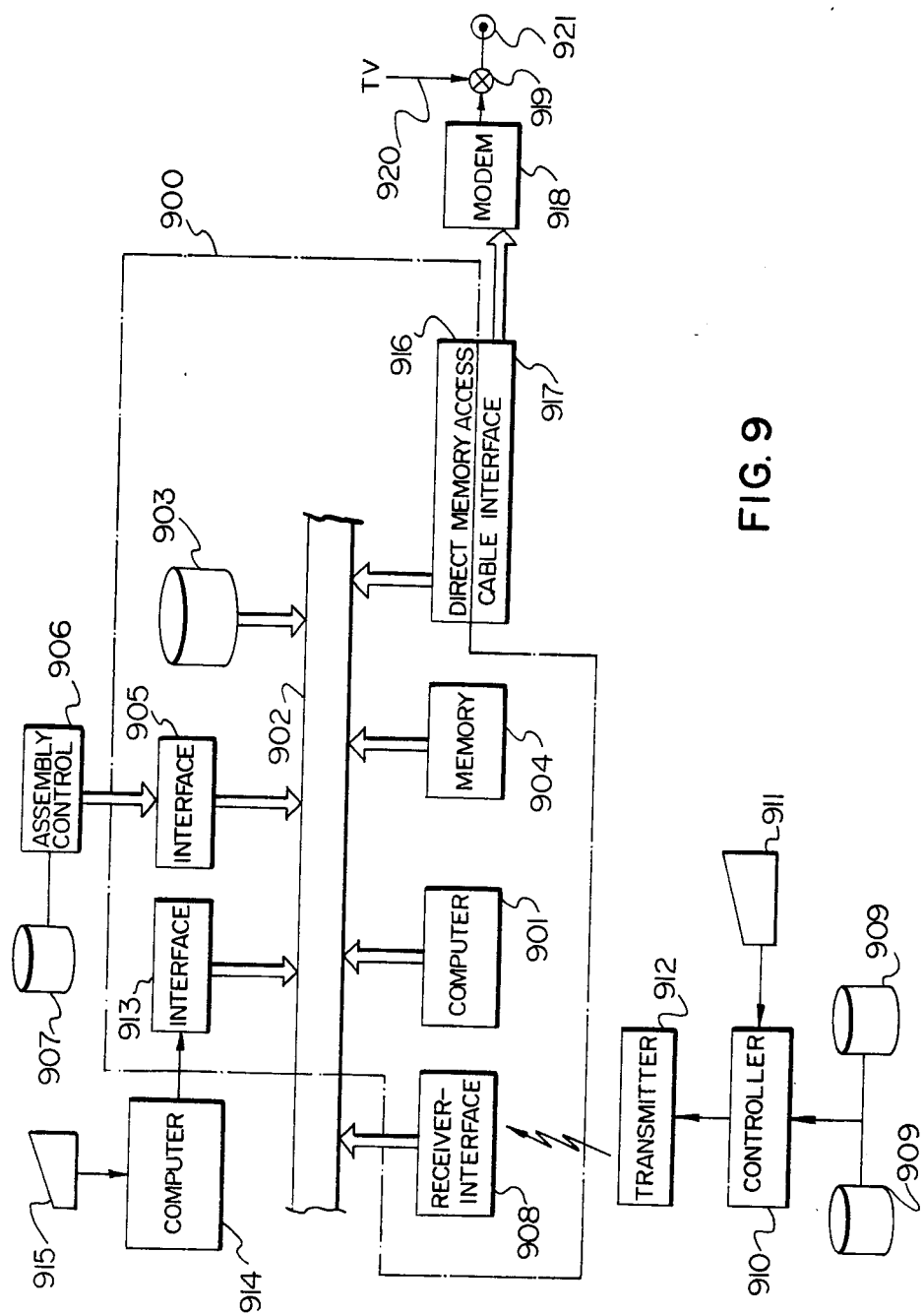

Turning now to the head end, it was noted earlier that control 104 prepares the packets of data and transmits them to the cable network. A block diagram of the control and its interfaces is shown in FIG. 9.

The head end is preferably controlled by a computer 900, such as the type PDP 11/34 which is available from the Digital Equipment Corporation. The main components of computer 900 consist of a central processing unit 901, a memory 904 consist of a central processing unit 901, a memory 904 for retaining its programs and some buffer areas, a hard disc sub-system 903 and a direct memory access circuit 916. All these components interface through a bus 902, preferably of the type referred to "UNIBUS" (trade mark) of which computer 900 is commonly equipped.

The disc sub-system should be capable of being read rapidly, e.g. at 4.6 megabits per second, since in the present system it is preferred to read data out at about 4 megabits per second to the "UNIBUS". A capacity of the hard disc subsystem should be at least 20,000 pages, each page containing an average of 40 characters by 20 lines, each character being 8 bits wide, totalling at least 128 megabits plus space for formatting data, etc.

The data to be transmitted to the cable system is assembled by computer 901 in a buffer area of memory 904. The content of disc memory 903 is continuously, rapidly and repetitively read at a 4 megabit second rate into this buffer area of memory 904. Interleaved with this data on occasion is data received from computer 914 via interface 913, also connected to bus 902.

The direct memory access circuit 916 is connected to a cable interface circuit 917. The cable interface circuit connects to a modem 918, the output of which is connected to an RF multiplexer 919, to which a source of broadcast and scrambled pay TV television signals is applied via link 920. The output of multiplexer 919 is connected to an RF terminal 921 for connection to the cable system.

Pages are added to or changed in disc subsystem 903 by so-called host subsystems. Each host subsystem is comprised of an assembly control computer and a source of data. These host subsystems generally fall into three category types, one of which is local, one of which is remote, and the third of which includes an operator interface for causing the formatting of test signals, the initiation of particular subscriber stations to newly authorized services, etc.

For example, in the first category type, a source of data consisting of a disc-subsystem 907 and a local assembly control 906 is connected to bus 902 through interface 905. Disc 907 can contain, e.g. 100,000 pages, or a small number of pages, and is used to format new pages to be transferred to disc drive 903 to update it.

In the second category, a receiver-interface 908 is connected to bus 902. This receiver-interface receives data via a communication line from any of a variety of remote sources, e.g. a stock market information provider, a videotex information provider (e.g. TELIDON), a remote X25 link, etc. In the system shown in FIG. 9, data at a remote location is formatted from a plurality of data storage disc sub-systems 909 under control of a controller 910. The controller is controlled from a keyboard operator station 911. Controller 910 connects to a transmitter 912, which connects to a transmission medium such as a coaxial cable, fiber optic or microwave link in common with receiver interface 908.

The third form of host sub-system is, for example, the existing cable operator service computer 914, to which a keyboard 915 is connected. Keyboard 915 can be used to command the initiation of new service options by causing subscriber station initiation signals to be generated and applied to the transmission medium.

Computer 914 retains a record of subscribers' names and addresses, payment record, etc. and was previously used for billing purposes, etc. In the present system, computer 914 contains two additional pieces of information for each subscriber, the subscriber logical address, which is unique to each subscriber, and a service address, which indicates the option codes. This data is entered into computer 914 via keyboard 915. Data management systems to handle this facility are well known, and need not be described in detail here.

When a new subscriber is to be added to the system, or when a particular group of subscribers have their service addresses or option tables changed, the operator gives computer 914 commands which updates the subscribers' addresses, and causes commands to be applied to bus 902 by interface 913, which causes computer 901 to format one or more data messages for initialization of a particular subscriber station or to update the service address or option table of one or a group of subscriber stations. The message format is stored in a memory contained within computer block 900 and can be of whatever form the designer wishes which would be recognized by the CPU at the subscriber terminal. After the message has been formatted, tranmission of data from disc drive 903 to memory 904 is interrupted and in its place the specially formatted messages from computer 901 are stored in memory 904 via bus 902. As soon as this has been completed, the further data is read from disc drive 903, which continues cycling and continuously and repetitively reading at the preferred rate of 1,000 pages per second.

Memory 904 is continuously read by direct memory access 916, which transfers the data to cable interface 917. Cable interface 917 formats the data into packets, adding flags, zeros, and busy bits as required, converting the data preferably to NRZI format, and transmitting the packets, separated by flag bytes, at 75 ohms to modem 918. Of course in a unidirectional downstream system modem 918 is a modulator.

Modem 918 modulates the data signal onto a carrier signal e.g. at television channel 14, or which has a centre frequency of approximately 120 megahertz. This signal is applied to one input of RF multiplexer 919, which also receives, for a broadcast television system, the remaining broadcast television signals to be transmitted via the cable. The television signal carried by the television link 920 can also contain a scrambled television signal which is to be unscrambled by unscrambler 304 (FIG. 3), for those subscribers which have purchased a pay-TV service.

Data from other sources are normally assembled in a cycle mode for storage on the main disc subsystem 903. For example a large information page library (e.g. 100,000 pages) can be stored on a large, slower-access disc drive 907. At various intervals, or upon command, various pages can be down-loaded under control of the assembly control 906 via interface 905 and bus 902 to disc sub-system 903. Once resident on disc 903 insubstitution for other stored pages, the pages resident on disc 903 are repetitively read as described earlier. Disc drive 907 can thus be used to assemble new pages of the information cycle or other data, for example computer game programs which are to be provided to the local subscriber's buffer memory 315 for use by the local CPU, for those subscriber terminals whose option table allows them to access the pages of data containing the game programs or the like. It will, of course, be recalled, that each page contains an option service address which corresponds to codes provided to those subscribers which can access the data contained in the packet.

The information or other data to be transmitted to the subscriber terminals can also be assembled at a remote location using the apparatus described earlier. A pair of disc drives 909 interface with a remote controller 910. The controller facilitates the assembly of data on the drives under control of a keyboard 911. Upon command, or constantly by way of a data link, the assembled data is transmitted by transmitter 912 to receiver-interface 908 for storage on disc sub-system 903 under control of computer 901.

Figure 10:
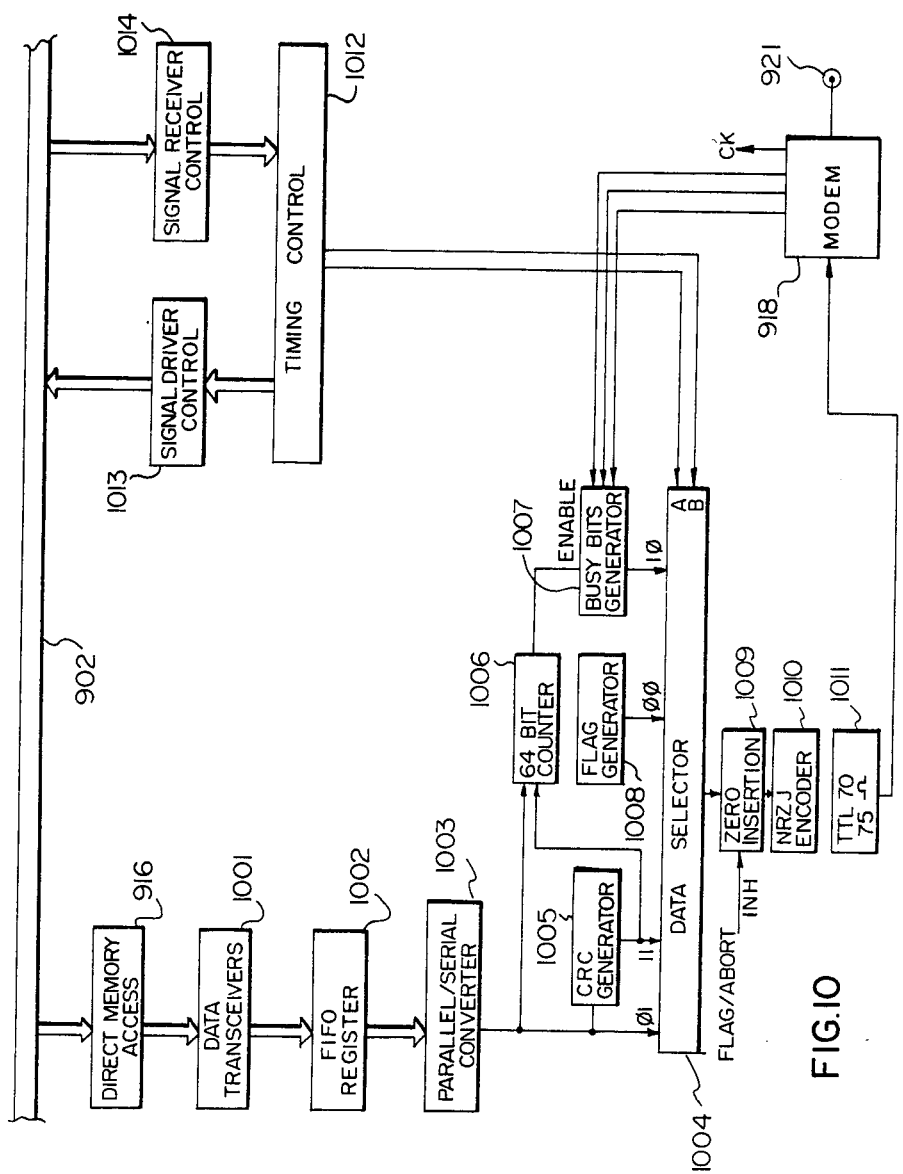

The repetitive cycling of disc drive 903 to load data into the buffer area of memory 904, and the accessing of this data by a direct data access can be provided by conventional and well known means. The operation of modem 918 is simply the reciprocal of the radio frequency portion of the circuit shown in FIG. 4. The modulation of an NRZI format data signal on an R.F. carrier signal is also be done by well known means, as well as the RF signal multiplexing in multiplexer 919 and subsequent transmission to cable 921. The cable interface circuit 917 will now be described with reference to FIG. 10.

The direct memory access circuit 916 is a conventional circuit for accessing data from sequential addresses in memory 904 and is connected to bus 902. Bus 902 is preferred to be a 16 bit bus, with the preferred form of computer 901, the PDP11/34, communicating in 16 bit data words.

Data transceiver 1001 receives the 16 bit words and passes them to a minimum 48 word first in, first out (FIFO) register 1002. The output signal from FIFO register 1002 is applied to parallel/serial converter 1003, which outputs the data at a 4 megabit per second rate to a data selector 1004.

The data is also applied to a CRC generator 1005, which calculates the frame check sequence bits (FCS bits, in FIG. 2) to be inserted after the information bits, according to the standard HDLC protocol. The frame check sequence, it will be recalled, consists of two bytes of 8 bits each.

The serial data bits are also applied to the counter 1006, which provides an enable output to a busy bits-generator 1007 after each predetermined number of bits, e.g. 64.

It will be recalled that this invention can be used in bi-directional transmission systems, in which signals are also transmitted upstream from the subscriber stations. However should two subscribers transmit at the same time, a collision of signals would occur, and the data received at the head end would be erroneous. Consequently as soon as the head end modem receives a signal, it immediately stimulates the generation of a change of state of the busy bits, which, it will be recalled, are inserted following each flag and every 64 bits thereafter. Consequently the 64 bit counter 1006 stimulates the generation of two busy bits following each 64 bits of serial data supplied from parallel/serial converter 1003. The output data signal of busy bits generator 1007 is also applied to data selector 1004.

A one byte (8 bit) flag generator 1008 continuously generates flag signals and applies them to data selector 1004.

The output of data selector 1004 is applied to a zero insertion circuit 1009, which generates a zero bit after every five 1's, according to the standard HDLC protocol. It will be recalled that the generation of six ones indicates that a particular packet should be disregarded (referred to herein as an abort signal). An input to zero insertion circuit 1009 is the presence of a flag or that an abort should take place which inhibits the generation of zeros.

The output signal from zero insertion circuit 1009 is applied to the input of an NRZI encoder 1010, whose output is connected to a TTL to 75 ohm converter 1011.

The output signal of converter 1011 is applied to modem 918 which has its output connected to RF terminal 921. Modem 918 contains a decoder for information received from the cable, which indicates that a subscriber originated signal has been received, in a bidirectional system. Thus modem 918 has a data output which is applied back to busy bits generator 1001, which causes the state of the busy bits to change.

It will be recalled that with two busy bits, four states are described, channel free, channel busy, collision detection, and priority. The output bits of busy bits generator 1007 would thus change from a channel free to a channel occupied status upon detection of a received carrier signal by modem 918.

It is the function of data selector 1004 to format the data packets. Consequently, a pair of inputs A and B, which can designate the selection of one of the four inputs is used to set the format. First the output byte of flag generator 1008 is selected (input 00) followed by a pair of busy bits from busy bit generator 1001 (input 10). This is followed by data received from the parallel/serial converter 1003 (input 01), which data contains the address followed by the information bits. After the information bits have been passed to the output of data selector 1004, the output of CRC generator 1005 is selected (input 11) followed by a flag byte from flag generator 1008. Every 64 bits, however, a pair of bits from busy bits generator 1007 are switched to the output, the busy bit code being set from signals received from the modem 918.

Of course in a single downstream direction system, the busy bits generator 1007 and 64 bit counter 1006 could be deleted or zeroed.

The timing of the data selector is under control of timing control 1012, which selects which of the inputs to data selector 1004 are selected. Timing control 1002 is under control of the main computer 901, and communicates thereto via timing control signal driver 1013, timing control signal receiver 1014 and bus 902. The generation of the packets is thus under complete control of computer 901.

A system has thus been described which permits the system operator to retain complete control over the services provided to the subscriber stations connected to this system. The system can be used with an already existing cable TV transmission system, and can be implemented in stages to provide increasing sophisticated services as the market would warrant. For example, once the subscriber stations are in place, the first option provided can be the unscrambling of pay TV signals and/or the provision of special broadcast television channels to selected subscribers by providing options which allow accessing of such channels via the television signal channel converter at the subscribers station. Groups of specialized subscribers, such as groups of doctors or other professionals can be provided with television educational channels which are prohibited to other subscribers. Computer game programs, stock market information, etc., can be provided to selected groups of subscribers which have the appropriate option codes. Computer programs can be downloaded to microcomputers, data can be sent to printers and facsimile machines, etc. Information cycles can be transmitted in a broadcast mode, but can be only accessed by those subscribers which have purchased the service and have the appropriate service code address stored in their option table memory.

The designation of the appropriate subscribers which can access and translate the signals designated for them is facilitated by the ability of the system operator to download on a selective basis option code service addresses from the head end. Since the service addresses can be changed at will by the system operator, the services extended to each individual subscriber can be easily changed without the visit of a serviceman, and provides the additional benefit of thwarting theft of service since the service codes can be changed frequently and randomly. The provision of services by the system operator is thus made more flexible and secure.

A person understanding the principles of the present invention may now conceive of changes, additional embodiments or variations in design, using the principles described herein. All are considered to be within the sphere and scope of the present invention as defined in the claims appended hereto.

We claim

1. A signal transmission system comprising:
  (a) a head end,
  (b) a transmission medium, connected to the head end, for carrying signals from the head end,
  (c) a plurality of subscriber stations connected to the transmission medium,
  (d) means at said subscriber stations for receiving and storing predetermined station address signals from the transmission medium,
  (e) means at said subscriber stations which have stored said station address signals, for receiving and storing program signals from said transmission medium having an address component which matches said stored address signals,
  (f) means at said subscriber stations having certain ones of said station address signals for receiving further signals from the transmission medium, having an address component which matches said certain ones of said address signals, and for translating said further signals, said translation being dependent on the prior storage of said program signals.

2. A signal transmission system comprising:
  (a) a head end,
  (b) a transmission medium connected to the head end, for carrying signals from said head end,
  (c) a plurality of subscriber stations connected to the transmission medium, in which each subscriber station includes
    (i) means for storing a first predetermined address code signal,
    (ii) means for receiving from the transmission medium and storing a second predetermined option code signal,
    (iii) means for receiving and storing a signal having an address component designative of the first or second code signals, and
    (iv) means for translating said latter signal in the event the address component matches said first or second code signals, and thereby enabling operation of the subscriber station in response thereto.

3. A signal transmission system as defined in claim 2, in which said translating means includes means for enabling said subscriber station to translate further signals in a manner prescribed by said latter signal upon reception by the subscriber station of signals having an address component designative of the first or second code signals.

4. A signal transmission system as defined in claim 3, further including means for receiving and translating signals from the transmission medium having either no address component or an address component restricted to said first predetermined code signal and for displaying said translated signal.

5. A signal transmission system comprising:
  (a) a head end,
  (b) a transmission medium connected to the head end, for carrying signals from the head end,
  (c) a plurality of subscriber stations connected to the transmission medium, each station comprising
    (i) first memory means for permanently storing a first address code signal,
    (ii) second memory means for storing a service code signal,
    (iii) third memory means for storing a control signal,
    (iv) means for providing a signal to a display device,
    (v) means for controlling the application of a signal broadcast on said transmission medium to the display device,
    (vi) data acquisition circuit means for applying the service code signal to the second memory means in the event of reception from the transmission medium of a service code signal having an address component matching the address code signal, and for applying to and storing a control signal in the third memory means in the event of reception of a signal from the transmission medium having a component which is an address matching the service code signal and a control signal component, and
    (vii) processor means for operating the controlling means according to the control signal in response to reception from the transmission medium of said broadcast signals of a kind controllable by said control signal.

6. A signal transmission system as defined in claim 5 in which the controlling means is comprised of a television signal unscrambler.

7. A signal transmission system as defined in claim 5 in which the controlling means is comprised of a television signal channel converter.

8. A signal transmission system as defined in claim 5 in which the controlling means is comprised of a video display generator.

9. A signal transmission system as defined in claim 5 in which the controlling means is comprised of a television signal unscrambler, a television signal channel converter, and a video display generator.

10. A signal transmission system as defined in claim 1, 2 or 5 in which the transmission medium is a CATV network.

11. A signal transmission system as defined in claim 1, 2 or 5 in which the head end is comprised of means for generating said signals in asynchronous packets in HDLC format.

12. A signal transmission system as defined in claim 1, 2 or 5 in which the head end is comprised of a mass digital signal storage system for storing said signals in predetermined order, a buffer memory for storing sequential strings of said signals, and means for applying said strings of said digital signals to the transmission medium according to said order.

13. A signal transmission system as defined in claim 1, 2 or 5 in which the head end is comprised of a mass digital signal storage system for storing said signals in predetermined order, a buffer memory for storing sequential strings of said signals, and means for applying said strings of said digital signals to the transmission medium according to said order, a source of television signals, and means for applying the television signals to the transmission medium with said strings of said digital signals, in different frequency bands.

14. A signal transmission system as defined in claim 1, 2 or 5 in which the head end is comprised of signal source means for generating signals for transmission on the transmission medium, a mass digital signal storage system for carrying said signals in digital form according to a predetermined order, and for sequentially reading said signals, a buffer memory for storing sequential strings of said signals, means for applying said strings to the transmission medium in a predetermined frequency band, and means for applying broadcast televison signals to said transmission medium in other frequency bands.

15. A subscriber station for connection to a tranmission medium for controlling the translation of signals carried by the transmission medium for application to a display device comprising:
  (i) first memory means for permanently storing a first address code signal,
  (ii) second memory means for storing a service code signal
  (iii) third memory means for storing a control signal
  (iv) means for providing a signal to a display device
  (v) means for controlling the application of a signal broadcast on said transmission medium to the display device,
  (vi) data acquisition circuit means for applying the service code signal to the second memory means in the event of reception from the transmission medium of a service code signal having an address component matching the address code signal, and for applying and storing a control signal to the third memory means in the event of reception of a signal from the transmission medium having an address component matching the service code signal and a control signal component, and
  (vii) processor means for operating the controlling means according to the control signal in response to reception from the transmission line of said broadcast signals of a kind controllable by said control signal,
whereby a display signal is provided for application to the display device.

16. A signal transmission system as defined in claim 15 in which the controlling means is comprised of a television signal channel converter, for converting a predetermined display device channel to a broadcast television channel received from the transmission medium under control of the processor means according to the control signal.

17. A signal transmission system as defined in claim 15 in which the controlling means is comprised of a video display generator, for generating alphanumeric character and/or pattern signals under control of the processor means according to the control signal.

18. A subscriber station as defined in claim 15, including:
  (a) a demodulator for connection to the transmission medium, for converting digital signals carried by the transmission medium to baseband,
  (b) a bus system
  (c) said data acquisition means including means for receiving the baseband digital signals and applying them to the bus system,
  (d) a logical address memory, forming said first memory means, for permanently storing said first address code signal, connected to the bus system,
  (e) a random access memory, forming the second memory means, for storing said service code signal as an option table, connected to the bus system,
  (f) a random access memory connected in a circuit to the data acquisition circuit and to the bus system for storing said control signals,
  (g) input-output circuit means connected to the bus system having a plurality of input and output control ports,
  (h) a television signal unscrambler having an input for connection in an input circuit path to the transmission medium, an output for connection in an output circuit path to a display device, and a control input connected to an output control port of the input-output port means,
  whereby the unscrambler is enabled upon generation of an unscramble signal by the processor means, applied to the input-output circuit means, under control of said control signal.

19. A subscriber station as defined in claim 18, further including a video display generator connected to the bus system for generating alphanumeric characters and/or pattern signals under control of the processor according to the control signal.

20. A subscriber station as defined in claim 18, further including a video display generator connected to the bus system for generating alphanumeric characters and/or pattern signals under control of the processor according to the control signal, means for receiving input order signals at an input control port, and means for generating further alphanumeric characters and/or pattern signals under control of the processor dependent on the interaction between said order signals and said control signals.

21. A subscriber station as defined in claim 15 in which the controlling means is comprised of a microcomputer.

22. A subscriber station as defined in claim 15 in which the display device is comprised of a printer.

23. A subscriber station as defined in claim 15 in which the controlling means is comprised of a facsimile display apparatus.

* * * * *